(12) United States Patent
Moran

(10) Patent No.: US 9,348,903 B2
(45) Date of Patent: May 24, 2016

(54) METHODS, DEVICES AND COMPUTER READABLE MEDIUMS FOR A MUSIC RECOGNITION GAME

(71) Applicant: John Moran, Campbellville (CA)

(72) Inventor: John Moran, Campbellville (CA)

( * ) Notice: Subject to any disclaimer, the term of this patent is extended or adjusted under 35 U.S.C. 154(b) by 60 days.

(21) Appl. No.: 13/762,858

(22) Filed: Feb. 8, 2013

(65) Prior Publication Data

US 2014/0228130 A1 Aug. 14, 2014

(51) Int. Cl.
*G06F 17/30* (2006.01)

(52) U.S. Cl.
CPC ..... *G06F 17/3074* (2013.01); *A63F 2300/8047* (2013.01)

(58) Field of Classification Search
USPC ........................................ 463/42, 43
See application file for complete search history.

(56) References Cited

U.S. PATENT DOCUMENTS

| | | | |
|---|---|---|---|
| 6,504,990 B1 | 1/2003 | Abecassis | |
| 6,590,568 B1 | 7/2003 | Astala et al. | |
| 6,601,066 B1 | 7/2003 | Davis-Hall | |
| 6,922,814 B2 | 7/2005 | Sirhall | |
| 6,996,064 B2 | 2/2006 | Klassen et al. | |
| 7,779,058 B2 | 8/2010 | Shea | |
| 7,940,935 B2 | 5/2011 | Nakahara et al. | |
| 8,194,657 B2 | 6/2012 | Xiong et al. | |
| 8,210,925 B2 | 7/2012 | Johnson | |
| 8,234,284 B2 | 7/2012 | Shao et al. | |
| 2002/0042293 A1 | 4/2002 | Ubale et al. | |
| 2002/0052889 A1 | 5/2002 | Shinoda | |
| 2002/0152278 A1 | 10/2002 | Pontenzone et al. | |
| 2003/0088571 A1 | 5/2003 | Ekkel | |
| 2003/0158924 A1 | 8/2003 | DeLegge | |
| 2005/0259947 A1 | 11/2005 | Wang et al. | |
| 2006/0023914 A1* | 2/2006 | Gold | G06T 7/2053 382/103 |
| 2007/0162300 A1 | 7/2007 | Roever et al. | |
| 2007/0162502 A1 | 7/2007 | Thomas et al. | |
| 2009/0077195 A1 | 3/2009 | Gibbs et al. | |
| 2009/0091087 A1 | 4/2009 | Wasmund | |
| 2010/0063734 A1* | 3/2010 | Kumar | B61L 25/025 701/300 |
| 2010/0105456 A1 | 4/2010 | Marufuji | |
| 2010/0211968 A1* | 8/2010 | Itskov | H04N 21/41407 725/25 |

(Continued)

OTHER PUBLICATIONS

Arrington, Michael "Song Pop Addiction and Synchronous Simulated Gameplay" Jun. 22, 2012, retrieved from <http://uncrunched.com> retrieved on Oct. 11, 2012.

(Continued)

*Primary Examiner* — Pierre E Elisca
(74) *Attorney, Agent, or Firm* — Bereskin & Parr LLP; Isis E. Caulder

(57) ABSTRACT

Devices and methods are disclosed for providing references to client devices. In one aspect a method includes storing, on a storage device, a plurality of references, each of the plurality references identifying a location of a media track file containing a media track. The plurality of references include a first reference identifying a first location of a first media track file. The method further includes storing, on the storage device, a playability rating for each of the plurality of references, updating the playability rating for the first reference based on an elapsed time for a first client device to receive a predetermined portion of the first media track file, and excluding the first reference from a selection of the plurality of references, in response to determining the playability rating for the first reference is below a threshold playability rating. Other devices, methods and computer program products are also disclosed.

21 Claims, 8 Drawing Sheets

(56) References Cited

U.S. PATENT DOCUMENTS

| | | |
|---|---|---|
| 2010/0235503 A1 | 9/2010 | Sitaraman et al. |
| 2011/0138064 A1 | 6/2011 | Rieger et al. |
| 2011/0264727 A1 | 10/2011 | Keum et al. |
| 2012/0131139 A1 | 5/2012 | Siripurapu et al. |
| 2012/0178527 A1 | 7/2012 | Kaskie et al. |
| 2012/0277939 A1* | 11/2012 | Kumar ............... B61L 15/0072 701/19 |
| 2015/0277737 A1* | 10/2015 | Coburn, IV ............... G06F 3/01 715/716 |

OTHER PUBLICATIONS

Zaggle, Inc "Song Quiz—A Free Name That Tune Game using Your iTunes Music Library for iPhone, iPod touch and iPad" retrieved from <http://itunes.apple.com> retrieved on Oct. 11, 2012.

* cited by examiner

METHODS, DEVICES AND COMPUTER READABLE MEDIUMS FOR A MUSIC RECOGNITION GAME

FIELD

The present disclosure relates to the field of music recognition games.

INTRODUCTION

In a music recognition game, a client device plays a song and challenges a user to quickly identify the name of the song. Prior to playing the song, the client device may download a song file corresponding to the song from a remote source. The user's gaming experience may depend upon a short delay before playing the song for the user. A slow download of a song file may lead to a long delay and a poor gaming experience.

In some cases, each song may have a corresponding difficulty. The client device may play songs having a difficulty commensurate with a difficulty chosen by a user. Generally, a user may choose a difficulty to tailor the game to their skill level and thereby improve their gaming experience. A poor association of difficulties to songs may frustrate a user's difficulty selection and deteriorate their gaming experience.

SUMMARY

In a first aspect, there is a method of providing references to client devices. In at least one embodiment, the method may include storing, on a storage device, a plurality of references, each of the plurality references identifying a location of a media track file containing a media track, the plurality of references including a first reference identifying a first location of a first media track file containing a first media track.

The method may also include storing, on the storage device, a playability rating for each of the plurality of references, updating the playability rating for the first reference based on an elapsed time for a first client device to receive a predetermined portion of the first media track file, excluding the first reference from a selection of the plurality of references, in response to determining the playability rating for the first reference is below a threshold playability rating, and sending the selection to a second client device, the selection including one or more references of the plurality of references, each of the one or more references identifying the location of a media track file that is eligible for download by the second client device.

In at least one embodiment, the method may also include receiving the elapsed time from the first client device. In at least one embodiment, the method also includes, before sending the selection, receiving a request for references from the second client device. In at least one embodiment, the method also includes receiving a request for references from the first client device, and sending the first reference to the first client device.

In at least one embodiment, the method may also include storing, on the storage device, the elapsed time. In at least one embodiment, the method may also include storing, on the storage device, an average elapsed time of a plurality of elapsed times, each of the plurality of elapsed times is an elapsed time for one of a plurality of client devices to download the predetermined portion of the first media track. Updating may be based on the average elapsed time.

In at least one embodiment, excluding the first reference from the selection of the plurality of references may include storing in the storage device an indication that the first media track is below the threshold playability rating.

In at least one embodiment, excluding the first reference from the selection of the plurality of references may include randomly selecting the one or more references from a subset of the plurality of references, the subset excluding the first reference.

In at least one embodiment, the method may also storing an identification of the predetermined portion on the storage device. In at least one embodiment, the identification comprises one of a time duration, a percentage, and a number of bytes.

In a second aspect, a computer-readable medium is provided. The computer-readable medium may include instructions executable by one or more processors, wherein the instructions when executed may configure the one or more processors to collectively store, on a storage device, a plurality of references, each of the plurality references identifying a location of a media track file containing a media track, the plurality of references including a first reference identifying a first location of a first media track file containing a first media track.

The computer-readable instructions, when executed may also configured the one or more processors to, collectively, store, on the storage device, a playability rating for each of the plurality of references, update the playability rating for the first reference based on an elapsed time for a first client device to receive a predetermined portion of the first media track file, exclude the first reference from a selection of the plurality of references, in response to determining the playability rating for the first reference is below a threshold playability rating, and send the selection to a second client device.

The selection may include one or more references of the plurality of references, and each of the one or more references may identify the location of a media track file that is eligible for download by the second client device.

In another aspect, a server device is provided for providing references to client devices. The server device may include a memory storing computer readable instructions; and one or more processors configured to execute the computer readable instructions. The computer readable instructions may configure the one or more processors to, collectively, store, on a storage device, a plurality of references, each of the plurality references identifying a location of a media track file containing a media track, the plurality of references including a first reference identifying a first location of a first media track file containing a first media track.

The computer readable instructions may also configure the one or more processors to, collectively, store, on the storage device, a playability rating for each of the plurality of references, update the playability rating for the first reference based on an elapsed time for a first client device to receive a predetermined portion of the first media track file, exclude the first reference from a selection of the plurality of references, in response to determining the playability rating for the first reference is below a threshold playability rating; and send the selection to a second client device.

The selection may include one or more references of the plurality of references, each of the one or more references identifying the location of a media track file that is eligible for download by the second client device.

In another aspect, there is provided a method of determining difficulty ratings for media tracks. The method may include storing, on a storage device, a first difficulty rating for a first media track; and determining a second difficulty rating for the first media track, in response to receiving gameplay data from a client device, based on the gameplay data and based on whether the first difficulty rating is between a first threshold difficulty and a second threshold difficulty. If the first difficulty rating is between the first and second threshold difficulty ratings, the second difficulty rating may differ from an intermediate rating, between the first and second threshold difficulty ratings, by a first difference. Also, if the first difficulty rating is not between the first and second threshold difficulty ratings, the second difficulty rating may differ from the intermediate rating by a second difference less than the first difference.

In at least one embodiment, the gameplay data includes a turn result, and the turn result may indicate whether a correct media track name selection was received at the client device for the first media track.

In at least one embodiment, the determining may be further based on whether the turn result positively indicates the correct media track name selection was received at the client device for the first media track.

In at least one embodiment, the gameplay data may include a turn time. The turn time may be a time duration of a game turn played at the client device. In at least one embodiment, the first media track may be at least a portion of a song.

In at least one embodiment, the method may further include storing, on the storage device, a difficulty rating for each of a plurality of media tracks, and for each of the plurality of media tracks: determining a second difficulty rating for that media track, in response to receiving the gameplay data from the client device, based on the gameplay data and whether the first difficulty rating is between the first and second threshold difficulty ratings. If the first difficulty for that media track rating is between the first and second threshold difficulty ratings, the second difficulty rating for that media track may differ from the intermediate rating by a corresponding first difference. If the first difficulty rating for that media track is not between the first and second threshold difficulty ratings, the second difficulty rating for that media track may differ from the intermediate rating by a corresponding second difference less than the corresponding first difference.

In another aspect, a computer-readable medium is provided. The computer-readable medium may include instructions executable by one or more processors, wherein the instructions when executed may configure the one or more processors to collectively, store, on a storage device, a first difficulty rating for a first media track and determine a second difficulty rating for the first media track, in response to receiving gameplay data from a client device, based on the gameplay data and based on whether the first difficulty rating is between a first threshold difficulty and a second threshold difficulty.

If the first difficulty rating is between the first and second threshold difficulty ratings, the second difficulty rating may differ from an intermediate rating, between the first and second threshold difficulty ratings, by a first difference. If the first difficulty rating is not between the first and second threshold difficulty ratings, the second difficulty rating may differ from the intermediate rating by a second difference less than the first difference.

DRAWINGS

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
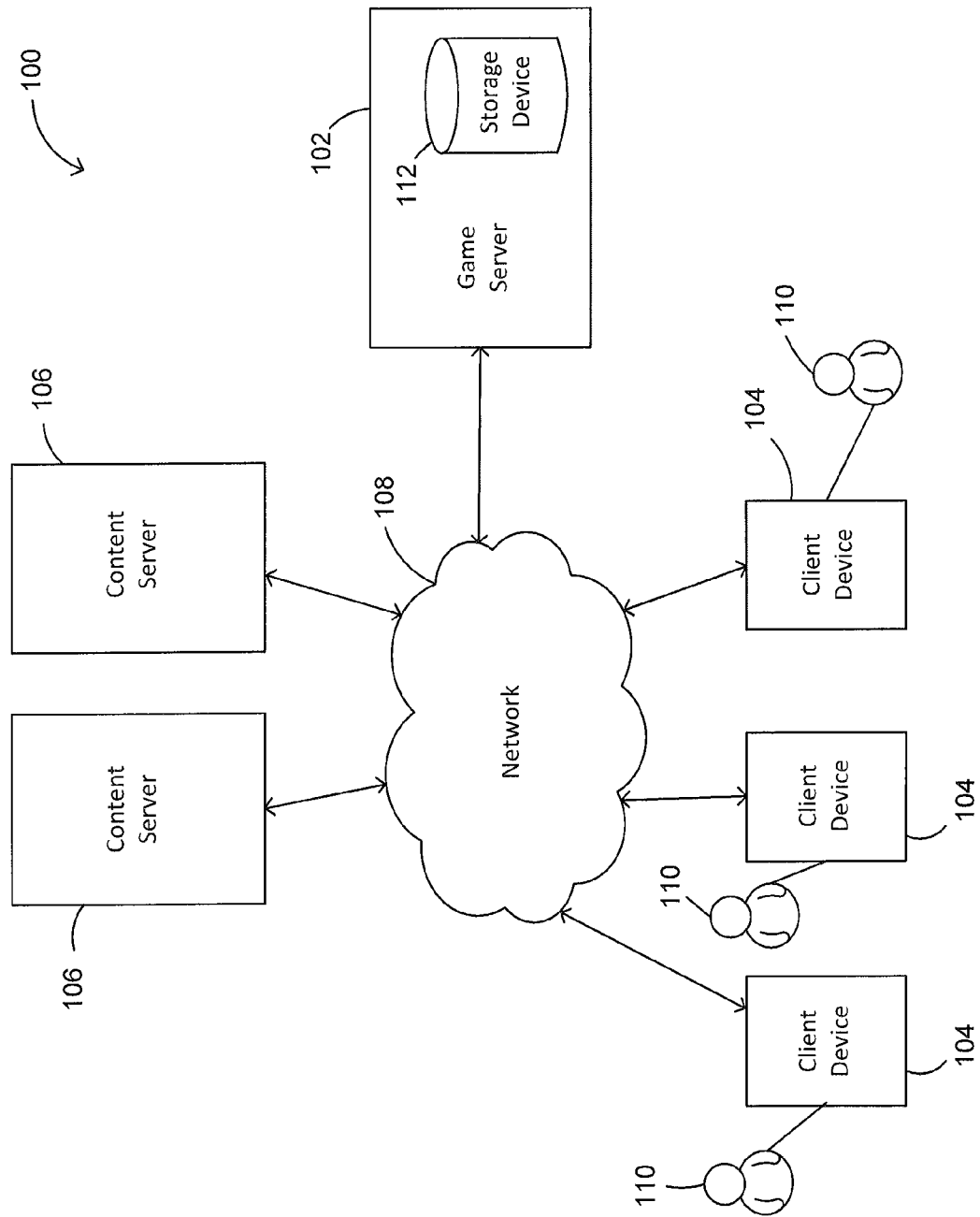
FIG. 1 is a block diagram illustrating a system for providing a media track recognition game, in accordance with at least one embodiment.

Referring to FIG. 1, a system 100 for a media track recognition game is shown, in accordance with at least one embodiment. In the example shown, system 100 includes a game server 102, client devices 104, and content servers 106, which communicate with each other across a network 108. Generally, a client device 104 can communicate with game server 102 and content server 106 across network 108 to retrieve and play media tracks, and challenge a user 110 to identify those media tracks.

Figure 2:
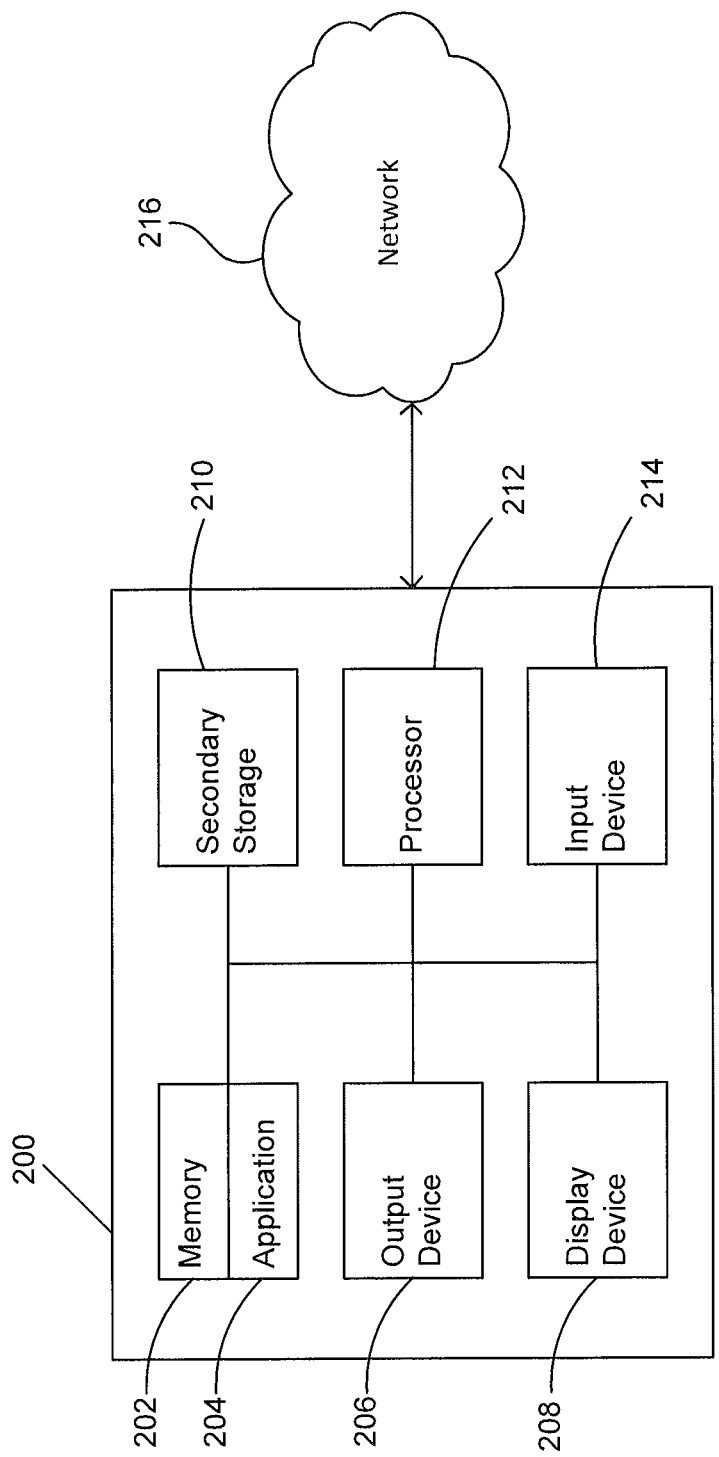
FIG. 2 is a schematic illustration of a device used in the system of FIG. 1, in accordance with at least one embodiment.

FIG. 2 shows an example schematic of a device 200. As shown, device 200 is generally illustrated as having hardware components, which can be used by one or more of the elements of system 100, such as game server 102, client devices 104, and content server 106. Generally, a device 200 can be a server computer, desktop computer, notebook computer, tablet, PDA, smartphone, or another computing device. In at least one embodiment, device 200 includes a connection with a network 216 such as a wired or wireless connection to the Internet or to a private network. In some cases, network 216 includes other types of computer or telecommunication networks. Network 216 may correspond with network 108 shown in FIG. 1.

In the example shown, device 200 includes a memory 202, an application 204, an output device 206, a display device 208, a secondary storage device 210, a processor 212, and an input device 214. In some embodiments, device 200 includes multiple of any one or more of memory 202, application 204, output device 206, display device 208, secondary storage device 210, processor 212, and input device 214. In some embodiments, device 200 does not include one or more of applications 204, secondary storage devices 210, network connections, input devices 214, output devices 206, and display devices 208.

Memory 202 can include random access memory (RAM) or similar types of memory. Also, in some embodiments, memory 202 stores one or more applications 204 for execution by processor 212. Applications 204 correspond with software modules including computer executable instructions to perform processing for the functions and methods described below. Secondary storage device 210 can include a hard disk drive, floppy disk drive, CD drive, DVD drive, Blu-ray drive, or other types of non-volatile data storage.

In some embodiments, device 200 stores information in a remote storage device, such as cloud storage, accessible across a network, such as network 216 or another network. In some embodiments, device 200 stores information distributed across multiple storage devices, such as memory 202 and secondary storage device 210 (i.e. each of the multiple storage device stores a portion of the information and collectively the multiple storage devices store all of the information). Accordingly, storing data on a storage device as used herein and in the claims, means storing that data in a local storage device, storing that data in a remote storage device, or storing that data distributed across multiple storage devices, each of which can be local or remote.

Generally, processor 212 can execute applications, computer readable instructions or programs. The applications, computer readable instructions or programs can be stored in memory 202 or in secondary storage device 210, or can be received from remote storage accessible through network 216, for example. When executed, the applications, computer readable instructions or programs can configure the processor 212 (or multiple processors 212, collectively) to perform the acts described herein with reference to game server 102, client device 104 or content server 106, for example.

Input device 214 can include any device for entering information into device 200. For example, input device 214 can be a keyboard, key pad, cursor-control device, touch-screen, camera, or microphone. Input device 214 can also include input ports and wireless radios (e.g. Bluetooth®, or 802.11x) for making wired and wireless connections to external devices.

Display device 208 can include any type of device for presenting visual information. For example, display device 208 can be a computer monitor, a flat-screen display, a projector or a display panel.

Output device 206 can include any type of device for presenting a hard copy of information, such as a printer for example. Output device 206 can also include other types of output devices such as speakers, for example. In at least one embodiment, output device 206 includes one or more of output ports and wireless radios (e.g. Bluetooth®, or 802.11x) for making wired and wireless connections to external devices.

FIG. 2 illustrates one example hardware schematic of a device 200. In an alternate embodiment, device 200 contains fewer, additional or different components. In addition, although aspects of an implementation of device 200 are described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM.

Referring again to FIG. 1, game server 102 is shown including a storage device 112. Storage device 112 may generally correspond to memory 202 or secondary storage device 210 described above with reference to device 200. Furthermore, storage device 112 may be locally connected to game server 102, or located remotely across a local network (e.g. in network attached storage (NAS)) or the Internet (e.g. in cloud storage).

Although FIG. 1 shows only one storage device 112, in some embodiments, game server 102 includes multiple storage devices 112. Each of the multiple storage devices 112 can be located locally or remotely. For clarity, various aspects are described below as being stored on storage device 112. However, in variant embodiments, these aspects can be stored on one or more of multiple storage devices (not shown) which are accessible to game server 102. For example, some aspects can be stored on a local storage device, some aspects can be stored on a remote storage device, and some aspects can be stored in part on the local storage device and in part on the remote storage device.

In the example shown, system 100 includes a network 108 through which game server 102, client device 104 and content server 106 communicate. However, in variant embodiments, system 100 includes a plurality of networks (not shown). In one example, client device 104 and game server 102 communicate with each other across a first local network (e.g. a local area network (LAN)), while client device 104 and content server 106 communicate with each other across a second public network (e.g. the Internet).

Figure 3:
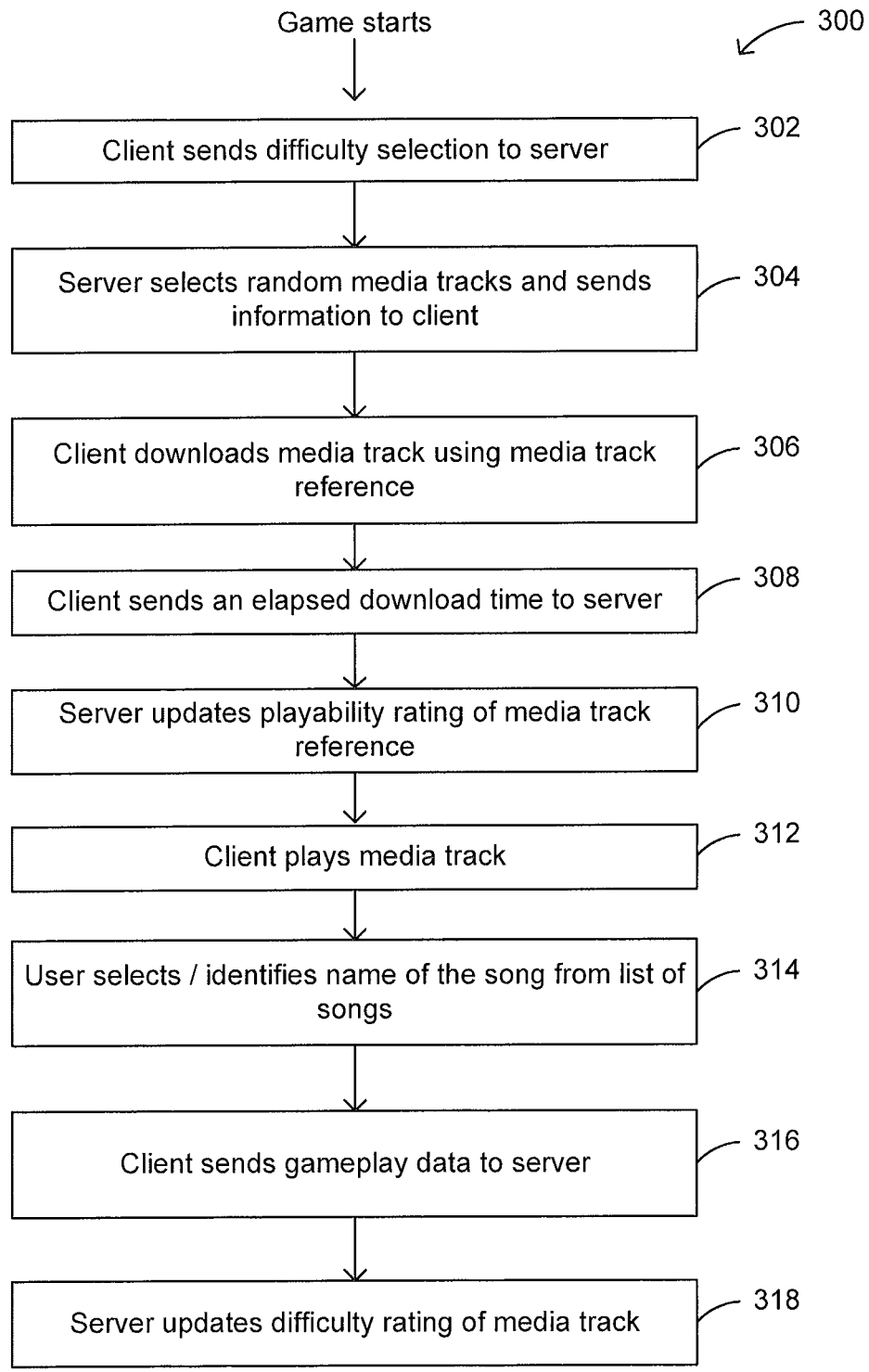
FIG. 3 is a flowchart illustrating a method of providing a media track recognition game, in accordance with at least one embodiment.
Figure 4A:
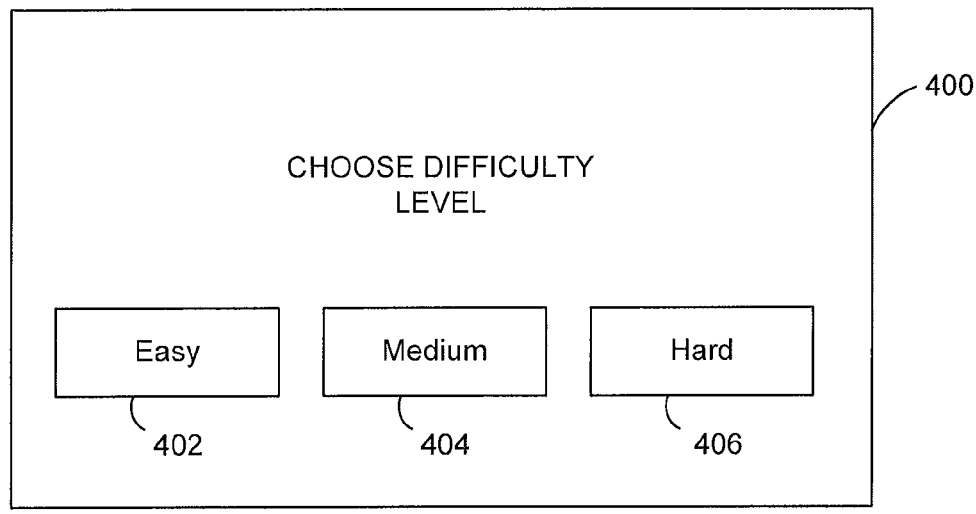
FIGS. 4a and 4b are screen captures of a graphical user interface (GUI) that can be displayed on a display of a device, in accordance with at least one embodiment.
Figure 4B:
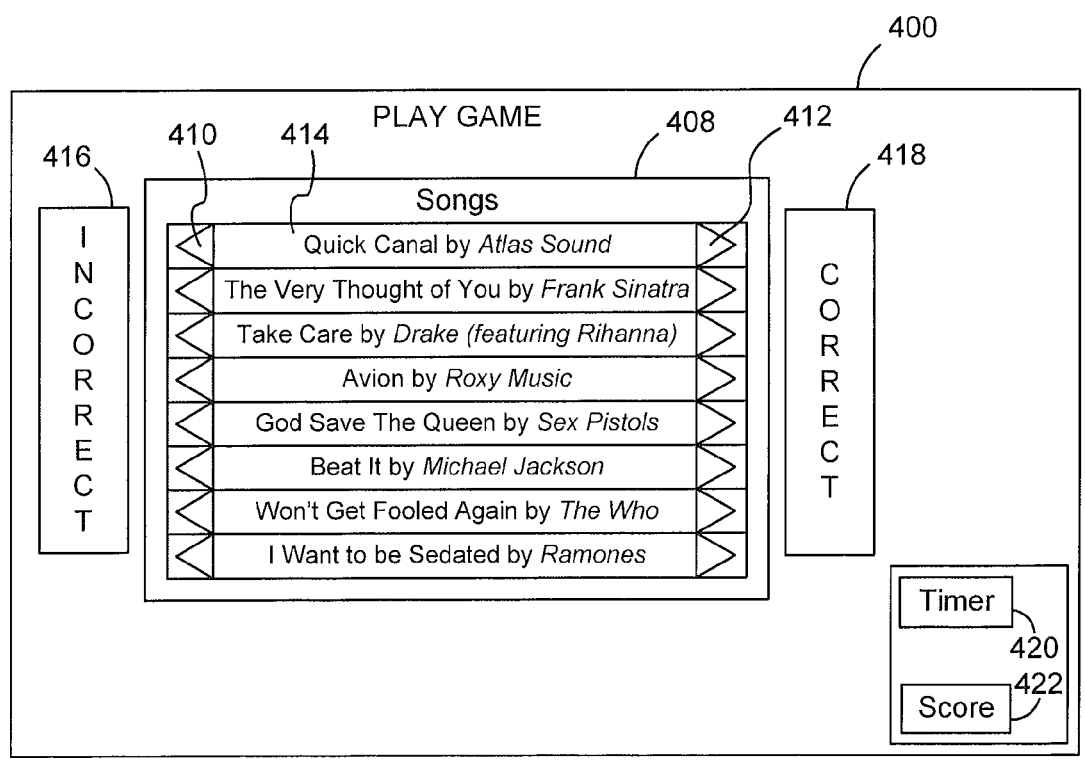

Reference is now made to FIGS. 3, 4a and 4b. FIG. 3 shows a flowchart illustrating a method 300 of providing a media track recognition game, in accordance with at least one embodiment. FIGS. 4a and 4b show screen captures of a graphical user interface (GUI) 400 that can be displayed on a display of a client device 104.

At 302, a client device 104 sends a request to begin a game to game server 102. In at least one embodiment, the request identifies a difficulty level. The request can identify the difficulty level in any suitable manner. For example, a difficulty level may be identified using a text string (e.g. "easy" or "hard"), or an associated number (e.g. 1, or 2) for example.

In the example shown, a user can interact with GUI 400 to select one of buttons 402, 404, and 406 which correspond to an easy, medium and hard difficulty level respectively. In this example, selecting one of buttons 402, 404, and 406 directs client device 104 to send the request identifying the corresponding difficulty level to the game server 102.

In at least one embodiment, client device 104 automatically selects a difficulty level for a user. In one example, client device 104 selects a random difficulty level from among a plurality of difficulty levels (e.g. easy, medium, and hard).

In at least one embodiment, game server 102 stores, in storage device 112, a difficulty level associated with a user 110 or a client device 104. In this example, when client device 104 sends a request to begin a game to game server 102, the request can identify the user 110 or client device 104 instead of a difficulty level. The game server 102 can identify the difficulty level associated with the user 110 or client device 104 identified in the request.

At 304, game server 102 selects a plurality of media tracks in response to request 302 and sends the selection to client device 104. A media track is an audio, video or audio-video composition, such as a song or a video, which has an identifiable name (e.g. a song name, or video name). Game server 102 stores in storage device 112 a plurality of records containing information about each of a plurality of media tracks. These records can be stored as discrete files, or as entries in a database, for example. In one example, game server 102 stores a name, author, difficulty rating and one or more references for each of a plurality of media tracks. In this example, selecting a plurality of media tracks includes identifying a plurality of media track records, and sending the selection to client device 104 includes sending at least a portion of each record to client device 104. In at least one embodiment, the portion of each record includes at least the name and one reference of the corresponding media track.

In at least one embodiment, game server 102 stores one or more references for each of the plurality of media tracks. Generally, a media track reference identifies at least the location of a file containing the media track. The same media track can be stored in duplicate files at different locations on the same or different devices. For example, the media track "Hey Jude" by the Beatles can be stored simultaneously as an MPEG-2 Audio Layer III (MP3) file on game server 102, an Advanced Audio Coding (ACC) file on client device 104 and an Ogg Vorbis file on content server 106. In this example, game server 102 can store three media track references for the media track "Hey Jude" by the Beatles: one media track reference identifying the location of the MP3 file on game server 102, one media track reference identifying the location of the ACC file on client device 104, and one media track reference identifying the Ogg Vorbis file on content server 106.

A media track reference can take any suitable form such as a uniform resource locator (URL) (e.g. for a media track file accessible over the Internet), or another uniform resource identifier (URI) (e.g. complying with an http, ftp or file schema), for example.

In at least one embodiment, a media track reference conforms to a custom schema. For example, a media track reference can include abbreviated information such as an identifier (e.g. a number) that can be expanded by cross-referencing stored information (e.g. a table). In one example, a media track reference identifies a host server and a file name, and the host server is abbreviated to a number. In this example, the number can be cross-referenced against a table to identify the server.

In at least one embodiment, a media track reference identifies the location of a file containing a media track by identifying an address which redirects to the location of the file. For example, in many Internet applications (e.g. Twitter®) it is common to use URL-shortening services. A user can provide a URL shortening service with any first URL and in return receive a second (typically shorter) URL that has been configured to automatically redirect to the first URL. As used herein and in the claims, a media track reference which identifies a first location configured to redirect to a location of a file, is a media track reference which identifies the location of the file.

In at least one embodiment, game server 102 randomly selects the plurality of media tracks to send to client device 104 from the plurality of media track records stored on storage device 112. In some cases, game server 102 randomly selects the plurality of media tracks to send to client device 104 from those media track records which include a difficulty rating that corresponds to the difficulty level received with the request at 302.

A difficulty rating is a value that estimates how difficult it is for users 110 (in the aggregate) to identify a media track. Determining and updating difficulty ratings for media tracks is discussed in detail later. Generally, a difficulty rating can be expressed in any manner suitable for identifying the relative difficulty of identifying a media track. In some embodiments, a difficulty rating is a number (e.g. 30) belonging to a set of ordered numbers (e.g. all integers from 0 to 100, or all real numbers from 0 to 100) that identify a spectrum from lowest difficulty to highest difficulty. For example, the lowest value of the set can represent the lowest difficulty and the highest value of the set can represent the highest difficulty, or vice versa. In some embodiments, a difficult rating is a letter (e.g. C) belonging to a set of ordered letters (e.g. A, B, C, D, E, F) which identify a spectrum from lowest difficulty to highest difficulty. In some embodiments, a difficulty rating is a string (e.g. "easy") from a set of ordered strings ("easy", "somewhat difficult", "difficult", "very difficult"), which identify a spectrum from lowest difficulty to highest difficulty.

A difficulty level identifies a difficulty rating or a range of difficulty ratings. In some cases, a difficulty level can be expressed as a difficulty rating (e.g. 30), a range of difficulty ratings (e.g. 20 to 50), or an expression that corresponds to a difficulty rating or range of difficulty ratings (e.g. "easy" can correspond to the range of difficulty ratings from 0 to 25). As used herein and in the claims, a difficulty level corresponds to a difficulty rating at least when (i) that difficulty rating is equal to a difficulty rating identified by the difficulty level, or (ii) when that difficulty rating falls within a range of difficulty ratings identified by the difficulty level.

At 306, client device 104 attempts to download a media track file using one of the references received at 304. In one example, client device 104 randomly selects one of the received media track references and sends an HTTP GET request to the identified location.

In at least one embodiment, client device 104 determines an elapsed time for the download request. In at least one embodiment, the client device 104 determines the elapsed time by measuring a time elapsed during a period starting with sending the download request and ending after the media track file is downloaded. In at least one embodiment, the elapsed time is the time elapsed during a period starting when the media track begins downloading to client device 104 and ending when media track finishes downloading to the client device 104.

At 308, client device 104 sends the elapsed time determined at 306 to game server 102. The elapsed time pertains to a download of a media track file requested from a media track reference. In at least one embodiment, client device 104 also sends to game server 102 the identify of that media track reference from which the media track file download was requested.

At 310, game server 102 uses the elapsed time to update a playability rating of the media track reference associated with the elapsed time. A playability rating is a value that grades the capacity of client devices 104 to rapidly download a media track file from a media track reference. In at least one embodiment, game server 102 stores a playability rating for each media track reference of each media track record. In some embodiments, media track references that have never been used by a client device 104 do not have a playability rating or they have a predetermined default playability rating. Determining and updating playability ratings is discussed in detail later.

At 312, client device 104 plays the downloaded media track contained in the media track file. If the media track is a song, the song is audibly emitted through speakers or other sound emitting device of client device 104. In at least one embodiment, the media track is a video and at least one of (i) the video is visually displayed on a display of client device 104, and (ii) audio is emitted through speakers or other sound emitting device of client device 104.

In at least one embodiment, client device 104 challenges user 110 to identify (e.g. the name) of the media track while the media track is playing at 314. In some cases, client device 104 displays a list of media track identities (e.g. names) from which a user 110 can make a selection. In at least one embodiment, the list of media track identities is derived from the portions of the plurality of media track records received from game server 102 at 304. In one example, game server 102 sends at least a name and a reference for each of eight media tracks. In this example, client device 104 uses one of the references to download and play one media track, and displays the names of all eight for the user 110 to select from.

In the example shown in FIG. 4b, user interface 400 displays a list 408 of song names. A user 110 of client device 104 can interact with user interface 400 to submit a media track name selection. As shown, each row of list 408 includes a left arrow 410, a right arrow 412 and a song name 414. As shown, a user 110 can select a left arrow 410 beside a song name to submit that the song that is playing does not have that song name. Similarly, a user 110 can select a right arrow 412 beside a song name to submit that the song that is playing does not nave that song name. In at least one embodiment, a user can selectively drag any row of list 408 onto an INCORRECT box 416 or onto a CORRECT box 418 to submit that the song that is playing does or does not have the song name in that row, respectively.

As shown, each row of list 408 corresponds with a media track of which information was received from game server 102 at 304. When client device 104 receives a media track name selection (e.g. by the interaction of user 110 with user interface 400), client device 104 determines if that media track name selection is a correct media track name selection.

In one example, when a user 110 submits a media track name selection by interacting with list 408 to select a row, client device 104 compares the name of the playing media track to the name of the media track corresponding to that row. In this example, if the name of the media track playing and the name of the media track corresponding to that row match (e.g. are equal) then the client device 104 has received a correct media track name selection.

In another example, when a user 110 submits a media track name selection by interacting with list 408 to select a row, client device 104 compares an identifier (e.g. a media track ID) of the media track that is playing to the media track identifier of the media track corresponding to that row. In this example, if the identifier of the media track playing and the identifier of the media track corresponding to that row match (e.g. are equal) then the client device 104 has received a correct media track name selection.

In the example shown, user interface 400 displays a score 422. Score 422 displays a running total of a user's score. In one example, correctly identifying the name 414 of a song that is playing increases the value of score 422, and doing so quickly greatly increases the value of score 422.

In the example shown, user interface 400 displays a timer 420. In at least one embodiment, timer 420 identifies the amount of time that remains for the client device 104 to receive a correct media track selection from user 110. If timer 420 reaches 0, the turn ends. Also, in some embodiments, if a user drags the name 414 of the song that is playing to the INCORRECT box 416 (or selects the corresponding left arrow 410), the turn ends. In some cases when the turn ends, so does the game, and the user is presented with an option to play again. In some cases, when the turn ends, a new round begins with a new media track playing and a new list of identities to select from. In one example, a new turn begins automatically after a user 110 correctly identifies the name 414 of a song that is playing.

At 316, client 104 sends gameplay data to game server 102. In some embodiments, gameplay data includes a turn result (e.g. whether the song was correctly identified or not), a turn time (e.g. the time duration of the turn), and the identity of the song that was playing. In at least one embodiment, a record stores gameplay data for each of a plurality of turns. In one example, a user 110 plays five consecutive turns before the game ends, and when the game ends client device 104 sends gameplay data including five records, one record for each turn.

At 318, game server 102 uses the gameplay data received at 316 to update the difficulty rating of one or more media tracks. Determining and updating the difficulty rating for a media track is discussed in more detail later.

Figure 5:
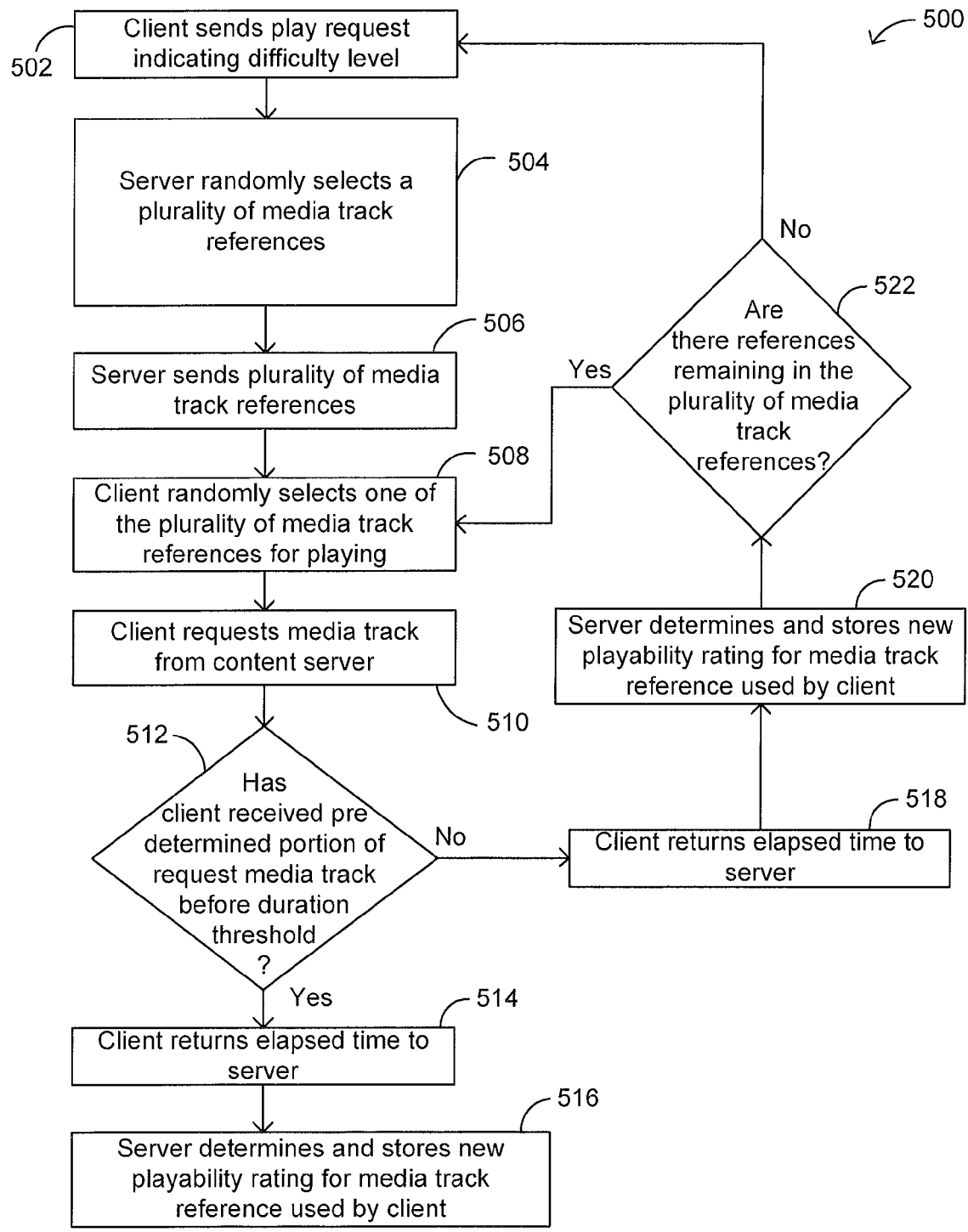
FIG. 5 is a flowchart illustrating a method of determining a playability rating for a media track reference, in accordance with at least one embodiment.

Referring now to FIG. 5, a flowchart illustrating a method of determining a playability rating for a media track reference is shown, in accordance with at least one embodiment.

At 502, client device 104 sends a request to begin a game. As discussed above, the request can include a difficulty level. The request is a request for a list of media track references to the extent that client device 104 expects to receive a list of media track references in response.

At 504, game server 102, selects a plurality of media track references. In at least one embodiment, the plurality of media track references is selected randomly. The plurality can include a predetermined quantity of media track references (e.g. 8). The plurality of media track references can be selected from the media track references stored in media track records on storage device 112.

Figure 6:
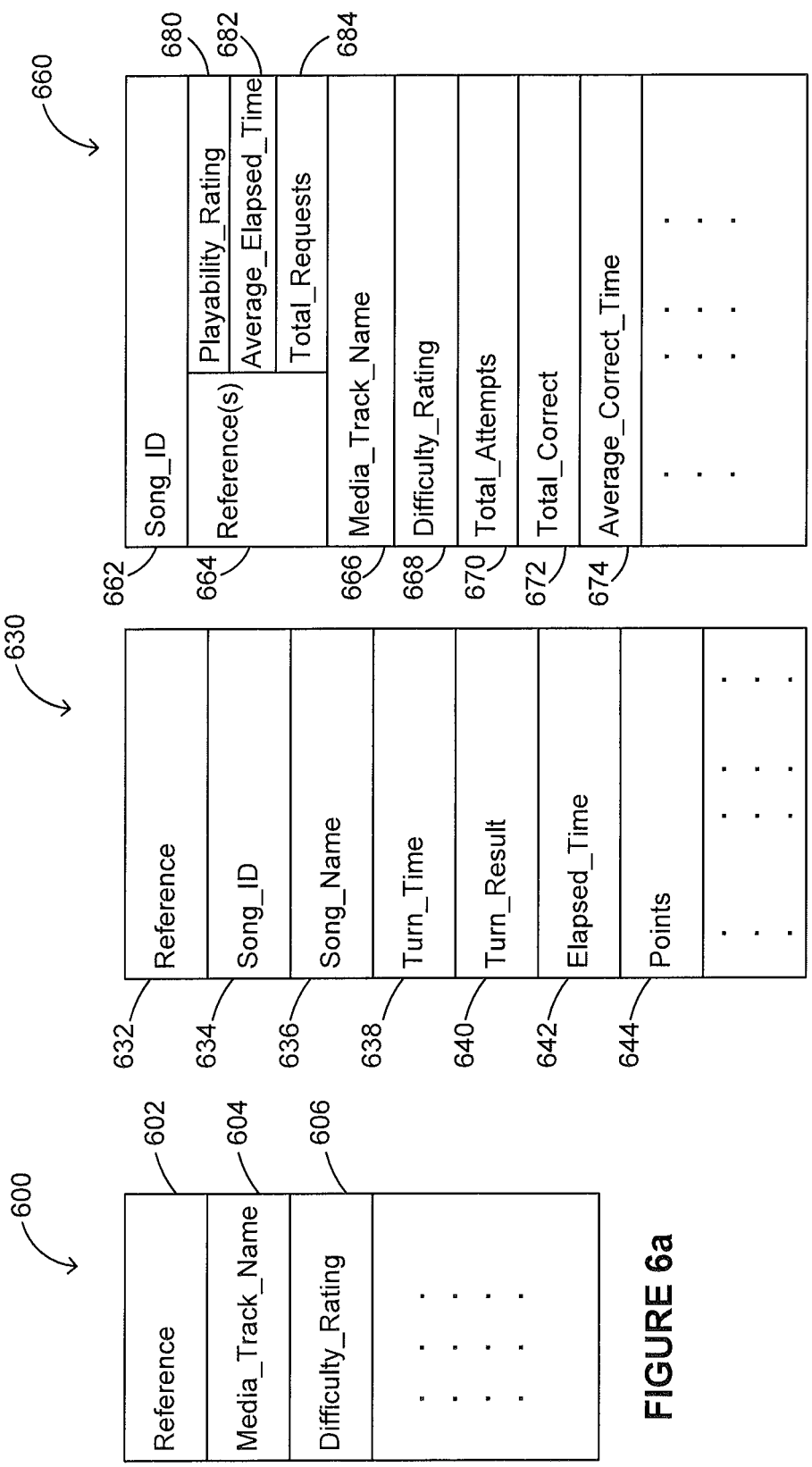
FIGS. 6a, 6b and 6c illustrate example records, in accordance with at least one embodiment.

FIG. 6c shows a media track record 660 in accordance with at least one embodiment. As shown, media track record 660 includes elements all of which correspond to the same media track. In the example shown, media track record 660 includes a song ID 662, one or more media track references 664, a media track name 666, a difficulty rating 668, a total attempts value 670, a total correct attempts value 672 and an average correct time value 674. Furthermore, each of the one or more media track references 664 is shown including a playability rating 680, an average elapsed time 682 and a total requests 684. In some embodiments, media track record 660 includes additional or fewer elements. For example, media track record 660 can additionally include an author name (not shown), and media track record 660 can omit difficulty rating 668.

The media track references may be selected from those media track records 660 including a difficulty rating 668 which corresponds to the difficulty level received at 502. Furthermore, in some embodiments, the selection of media track references excludes media track references 664 having a poor playability rating 680.

As discussed above, a playability rating can be a value belonging to a set of ordered values which identify a spectrum from lowest playability to highest playability (e.g. integers from 0 to 100). Among those values can be a threshold playability rating (e.g. 50). In at least one embodiment, the plurality of media track references is selected from the media track references 664 stored on storage device 112 which have a playability rating 680 equal to or better than the threshold playability rating (e.g. greater than or equal to 50). In at least one embodiment, game server 102 can store an indication that the playability rating 680 of a media track reference 664 is below a threshold playability rating (e.g. a true/false boolean field in media track record 660, not shown). In that case, game server 102 may select the plurality of media track references from those media track references 664, stored on storage device 112, which do not include positive indications that the playability rating 680 of those media track references 664 is below the threshold playability rating. In at least one embodiment, game server 102 can temporarily remove or permanently delete a media track reference 664 from a media track record 660 or storage device 112 in response to determining the playability rating 680 of that media track reference 664 is below a playability rating threshold.

Playability ratings grade the capacity of client devices 104 to rapidly download a media track file from a media track reference. Generally, a media track reference 664, from which a media track file is consistently rapidly downloaded to client devices 104, will have an excellent playability rating 680. Accordingly, in at least one embodiment, selecting media track references 664, to send to client device 104, which have better playability ratings 680 can lead to a faster download for a user 110, and therefore a shorter delay before a song can play at the start of a turn. This can enhance a user's gameplay experience.

At 506, game server 102 sends to client device 104 a plurality of media track references, each media track reference corresponding to a media track. In at least one embodiment, game server 102 sends to client device 104 a plurality of records, each record corresponding to a media track. FIG. 6a shows an example record 600, in accordance with at least one embodiment. Record 600 can include one or more elements derived from a media track record 660, for example. In the example shown, record 600 includes a media track reference 602, a media track name 604, and a difficulty rating, all corresponding to the same media track. In at least one embodiment, game server 102 sends a plurality of records 600 to client device 104, each record 600 corresponding to a different media track. In some embodiments, record 600 contains additional or fewer elements. For example, record 600 can also include an author name (not shown), and record 600 can omit difficulty rating 606.

At 508, client device 104 selects one of the plurality of media track references 602 received at 506 from game server 102. The selection can be random or arbitrary (e.g. the first in the list).

At 510, client device 104 requests a media track file using the selected media track reference 602. In one example, client device 104 sends a file download request or a file stream request to the location identified by the selected media track reference 602. The selected media track reference may identify a location on a content server 106, a game server 102 or even a client device 104 for example.

At 512, client device 104 determines whether client device 104 has received a predetermined portion of the requested media track file before a threshold duration. In some embodiments, the predetermined portion is the entire media track file. In some embodiments, the predetermined portion is a fraction or percentage of the media track file (e.g. ½ or 50%). In some embodiments, the predetermined portion is a number of bytes (e.g. 1 megabyte).

In some embodiments, the predetermined portion is a time duration (e.g. 10 seconds). For example, the predetermined portion can be the first 20 seconds of the media track file. It will be appreciated that different media track files can have different bitrates (the number of bits per second of the media track), whether they contain the same or different media tracks. Similarly, the same media track can be stored in media track files at different compression ratios, such that two media track files containing the same media track can have different file sizes (e.g. in bytes). For example, the first 20 seconds of a song contained in an MP3 format file may not be the same size (i.e. in bytes) as the first 20 second of the same song stored in an Ogg Vorbis format file. In fact, two MP3 format files each storing the same song can have different bitrates, different compression ratios and different file sizes.

A predetermined portion for each of the selected plurality of media tracks references can also be sent to client device 104 at 506. At 512, client device 104 can determine whether the predetermined portion associated with the requested media track has been received at client device 104 before a threshold duration.

In at least one embodiment, the threshold duration to receive a predetermined portion of a media track corresponds to what is an unacceptable duration for a user 110 to wait before playing a media track. In one example, the threshold duration is 10 seconds.

In at least one embodiment, the record for each media track stored on game server 102 identifies a predetermined portion. The stored predetermined portion for a media track can reflect the allowable use (e.g. statutory or under a license) that can be made of that media track. In one example, a license permits users 110 to download an entirety of a media track, and the record associated with the media track identifies the predetermined portion as the entire song (e.g. 100%). In another example, a common law exception permits users 110 to download a 30 second portion of a media track, and the record associated with the media track identifies the predetermined portion as 30 seconds. In at least one embodiment, after client device 104 receives the predetermined portion of a media track, the client device 104 discontinues receiving any further portions of the media track. That is, client device 104 can be configured to receive no more than the predetermined amount of a media track file. In at least one embodiment, this can help to prevent prohibited uses of media tracks by client devices 104, and help to avoid some of the associated legal troubles.

If client device 104 receives, at 512, the predetermined portion of the media track before the threshold duration, the method proceeds to 514. At 514 client device 104 returns the elapsed time, for client device 104 to receive the predetermined portion, to game server 102. In at least one embodiment, client device 104 sends to game server 102 a gameplay record. FIG. 6b shows a gameplay record 630, in accordance with at least one embodiment. In the example shown, gameplay record 630 contains gameplay data including a media track reference 632, a media track ID 634, a media track name 636, a turn time 638, a turn result 640, an elapsed time 642 and a points score 644. In at least one embodiment, gameplay record 630 contains fewer or additional elements. For example, gameplay record 630 can additionally include a user ID to identify user 110 (e.g. to populate a high score table), and can omit media track name 636.

At 516, game server 102 can use the elapsed time received at 514 to determine and store a new playability rating for the media track reference at 516.

In at least one embodiment, game server 102 determines the playability rating for a media track reference as an average of elapsed times received from client device 104 in respect of that media track reference. In one example, when a first ever elapsed time is received by game server 102 in respect of a media track reference, game server 102 can store on storage device 112 a playability rating equal to the received elapsed time. In this example, when a second elapsed time is received by game server 102 in respect of the same media track reference, game server 102 may determine an average of the first and second elapsed times, and store a playability rating equal to the average elapsed time.

In at least one embodiment, game server 102 determines a playability rating by normalizing the average received elapsed time for a media track reference. In one example, an average elapsed time for a media track reference can range from 0 seconds to a threshold duration of 10 seconds, previously considered at 512. In this example, playability ratings belong to a set of real numbers between 0 and 100. Continuing the example, game server 102 determines a playability rating by determining an average elapsed time and reallocating that elapsed time from the range of 0 to 10 seconds, to the playability ratings range of 0 to 100. Game server 102 would determine that average elapsed times of 0, 5 and 10 seconds correspond to playability ratings of 0, 50 and 100 in this example.

If, at 512, client device 104 determines that the predetermined portion of the requested media track file is not received before the threshold duration then the method proceeds to 518. At 518, client device 104 sends game server 102 an elapsed time equal to the threshold duration. Step 518 is analogous to step 514 described above. If, at 518, client device 104 sends game server 102 a gameplay record 630, the gameplay record 630 may include reference 632, elapsed time 642 (here, equal to the threshold duration) and omit or leave blank the other elements.

At 520 game server 102 determines and stores a new playability rating for the media track requested by client device 104. In one example, game server 102 uses the received elapsed time to calculate a new average elapsed time for game server 102 and uses the new average elapsed time to determine a new playability rating as described above.

At 522, client device 104 determines whether there are any remaining media track references in the plurality of references, received at 506, which client device 104 has not yet requested. For example, if client device 104 received eight media track references at 506, and client device 104 has attempted to download one media track using one of the eight media track references, then there are seven media track references remaining that have not yet been requested.

If, at 522, client device 104 determines that there is at least one remaining media track reference in the plurality of references, received at 506, which client device 104 has not yet requested, then the method returns to 508. At 508, client device 104 selects one of the remaining of the plurality of media track references to request at 510.

If, at 522, client device 104 determines that there is not at least one remaining media track reference in the plurality of references, received at 506, which client device 104 has not yet requested, then the method returns to 502. At 502, client device 104 sends a new request to game server 102 requesting a plurality of media track references.

Figure 7:
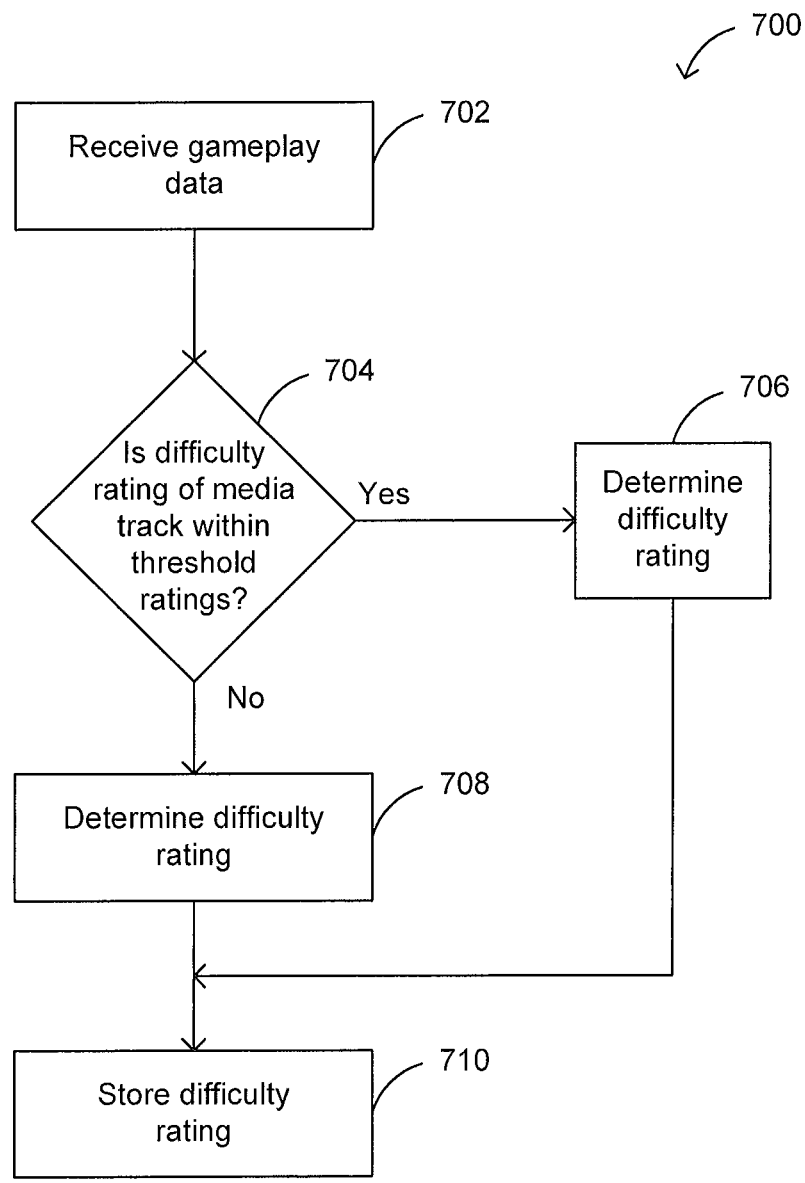
FIG. 7 shows a flowchart illustrating a method of determining a difficulty rating, in accordance with at least one embodiment.
Figure 8:
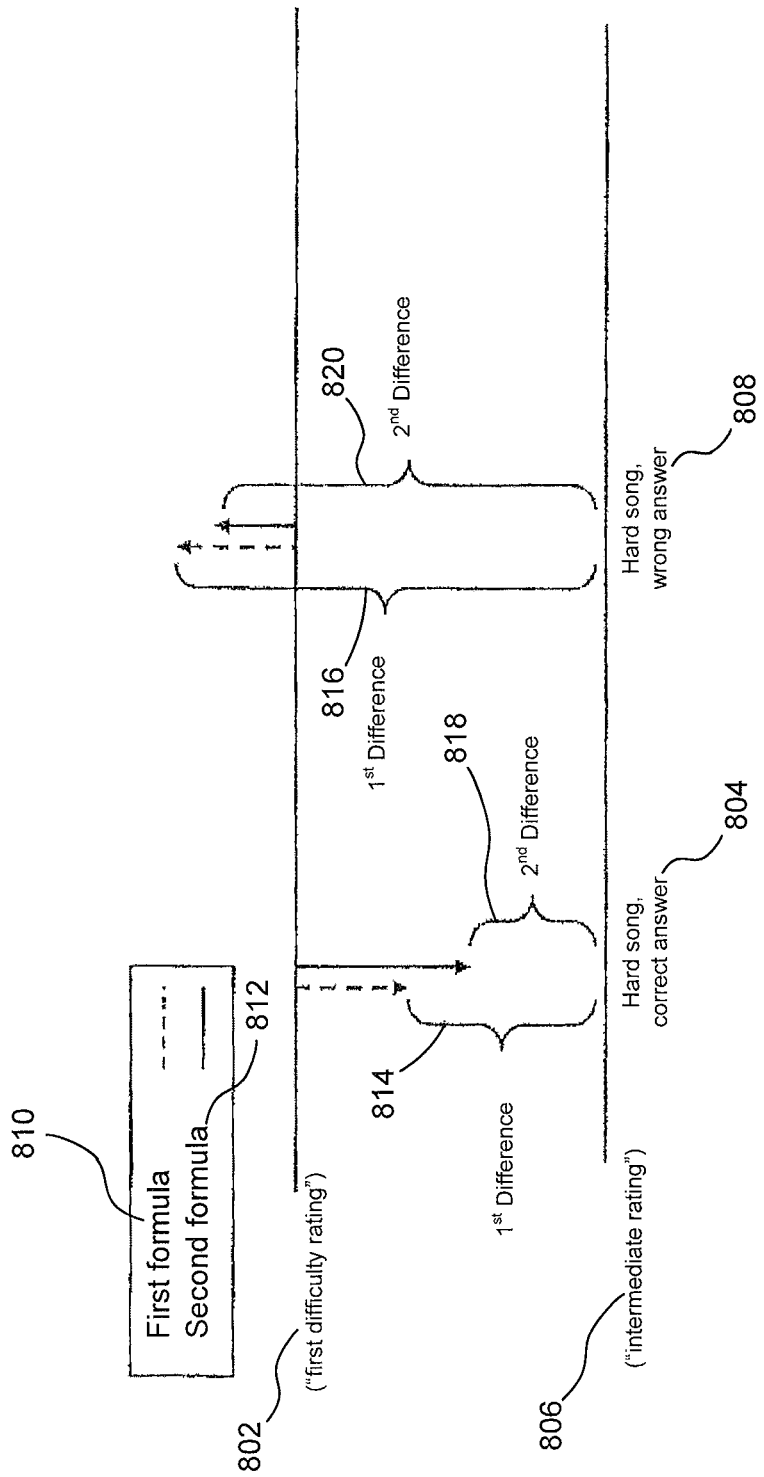
FIG. 8 illustrates contrasting results of updating a difficulty rating inside of a pair of thresholds and updating a difficulty rating outside of the pair of thresholds.

Reference is now made to FIGS. 7 and 8. FIG. 7 shows a flowchart illustrating method 700 of determining a difficulty rating, in accordance with at least one embodiment. FIG. 8 illustrates the contrasting results of updating a difficulty rating inside of a pair of thresholds and updating a difficulty rating outside of the pair of thresholds.

At 702, game server 102 receives gameplay data from a client device 104. In one example, client device 104 sends game server 102, a record, such as record 630 shown in FIG. 6b, containing gameplay data. Generally, gameplay data includes information related to a user's interaction with the game at a client device 104. Client device 104 may send gameplay data to game server 102 after a turn ends, or after a game ends for example. As discussed above, gameplay data may be stored in a gameplay record 630 and include one or more of a media track reference 632, a media track ID 634, a media track name 636, a turn time 638, a turn result 640, an elapsed time 642 and a points score 644, for example.

At 704, game server 102 determines whether the media track identified by the gameplay data is associated with a difficulty rating that falls between a first threshold rating and a second threshold rating. For example, game server 102 identifies the media track record on storage device 112 which corresponds to the media track record identified by the gameplay data, and determines whether the difficulty rating in that media track record falls between the first and threshold ratings.

In at least one embodiment, the first and second threshold difficulty ratings define an intermediate range of difficulty ratings. In this case, media tracks associated with difficulty ratings outside the first and second threshold ratings are considered to be either very difficult or very easy.

If game server 102 determines, at 704, that the media track has a difficulty rating that falls between the first and second threshold ratings, then the method proceeds to 706. At 706, a new difficulty rating is determined for the media track using the gameplay data received at 702 and a first formula. If game server 102 determines, at 704, that the media track has a difficulty rating that falls outside the first and second threshold ratings, then the method proceeds to 708. At 708, a new difficulty rating is determined for the media track using the gameplay data received at 702 and a second formula. At 710, the new difficulty rating determined at 708 is stored in storage device 112.

A difficulty rating can be calculated in any one of a number of ways. In at least one embodiment, game server 102 determines the difficulty rating based upon the gameplay data received at 702. In one example, the difficulty rating is calculating using a first formula:

$$D_{New} = D_{Old} + a \times \text{Turn}_{Result} \qquad \text{FIRST FORMULA}$$

In the example of a First Formula, above, $D_{New}$ is the updated difficulty rating for a media track based upon gameplay data received in respect of that media track and the previous difficulty rating $D_{old}$ of that media track. As shown, a is a positive constant, and $\text{Turn}_{Result}$ is a number representing the turn result (e.g. 1 if a correct media track name selection as received, and −1 if not). In this example, difficulty ratings belong to the set of 0 to 100 with 0 representing a very easy media track, and 100 representing a very hard media track.

In this example, when gameplay data is received indicating an incorrect turn result (i.e. the player was unsuccessful at identifying the media track that was playing), $\text{Turn}_{Result}$ equals −1, and the difficulty rating decreases (i.e. $D_{New}$ is less than $D_{Old}$). When gameplay data is received indicating a correct turn result (i.e. the player successfully identified the media track that was playing), $\text{Turn}_{Result}$ equals 1, and the difficulty rating increases (i.e. $D_{New}$ is greater than $D_{Old}$).

In at least one embodiment, game server 102 stores first and second threshold difficulty ratings. The first and second threshold difficulty ratings can be any two different difficulty ratings as long as they fall within the same set of values as all other difficulty ratings. In one example, difficulty ratings belong to the set of real numbers from 0 and 100, and the first and second difficulty ratings are 30 and 70.

In at least one embodiment, if game server 102 determines, at 704, that the media track has a difficulty rating that falls between the first and second threshold ratings, then a new difficulty rating is determined for the media track using a first formula, such as the example First Formula, above. However, if game server 102 determines, at 704, that the media track has a difficulty rating that falls outside the first and second threshold ratings, then a new difficulty rating is determined for the media track using a second formula, such as the example Second Formula, below.

$$D_{New} = D_{Old} + \begin{cases} b \times \text{Turn}_{Result} \\ \text{OR} \\ c \times \text{Turn}_{Result} \div \text{Total}_{Attempts} \end{cases} \quad \text{SECOND FORMULA}$$

In the example of a Second Formula, above, $D_{New}$ is the updated difficulty rating for a media track based upon gameplay data received in respect of that media track and the previous difficulty rating $D_{Old}$ of that media track. As shown, b and c are positive constants, $\text{Turn}_{Result}$ is a number representing the turn result, as above, and $\text{Total}_{Attempts}$ is a historical count of $\text{Turn}_{Result}$'s received in respect of the media track (e.g. from one or more clients 104). In the example shown, $D_{New}$ is calculated by adding to $D_{Old}$ either the upper expression ($b \times \text{Turn}_{Result}$) or the lower expression ($c \times \text{Turn}_{Result}/\text{Total}_{Attempt}$). The choice of the upper or lower expression may depend upon whether the media track has a very hard rating or a very easy rating, and whether the gameplay data indicates whether the client device 104 received a correct media track name selection or not. Generally, the lower expression may produce a smaller change in difficulty rating because of the division by the total attempts.

In one example, if the gameplay data indicates a correct media track name selection, then the upper expression is used if the difficulty rating is very hard (e.g. above 70), and the lower expression is used if the difficulty rating is very easy (e.g. below 30). Continuing this example, if the gameplay data indicates there was not a correct media track name selection, then the upper expression is used if the difficulty rating is very easy, and the lower expression is used if the difficulty rating is very hard. In at least one embodiment, this slows changes in a very hard difficulty score to even harder difficulty scores, and slows changes in very easy difficulty scores to even easier difficulty scores.

In at least one embodiment, the second formula slows the progression of difficulty ratings further outside of the first and second difficulty rating thresholds, and accelerates the progression of difficulty ratings toward difficulty ratings inside of the first and second difficulty threshold. In one embodiment, this can be more plainly described as: it is easier to make a hard rating easier, and hard to make a hard rating harder (and vice versa for easy ratings). This tends to cause difficulty ratings to gravitate toward values between the difficulty rating thresholds.

In one simplified example, difficulty ratings range from 0 (easiest) to 100 (most difficult), and there are threshold difficulty ratings at 30 and 70. A media track has a difficulty rating of 90 (outside of the thresholds, on the hard side). In this example, when gameplay data including a correct turn result is received, the second formula is applied and the difficulty rating drops by 10, to 80. However, if the first formula was applied instead of the second formula, the difficulty rating would have dropped by only 5, to 85. Similarly, if gameplay data including an incorrect was receive, then applying the second formula, the difficulty rating might increase by 5 to 95, while applying the first formula might increase the difficulty rating by 10 to 100.

FIG. 8 illustrates the contrasting results of updating a difficulty rating inside the first and second difficulty rating thresholds and updating a difficulty rating outside of the first and second difficulty rating thresholds. In the example shown, the difficulty rating of a media track starts at a first difficulty rating 802 before it is updated. In this example, the first difficulty rating is a very hard difficulty rating, and it is outside of first and second threshold ratings (not shown). As shown, there is an intermediate rating 806. Intermediate rating 806 is any difficulty rating between the first and second threshold ratings. Accordingly, in this example the intermediate rating 806 is an easier rating than the first difficulty rating 802. In this example, a change in difficulty rating toward the intermediate rating 806 represents a change in difficulty rating toward values between the first and second threshold difficulty ratings.

The example illustrates two scenarios: a first scenario 804 in which gameplay data is received indicating a correct turn result that decreases the difficulty rating of the media track toward intermediate rating 806, and a second scenario 808 indicating an incorrect turn result that increases the difficulty rating of the media track away from intermediate rating 806. For each scenario 804, 808, the change in difficulty rating from applying the first formula 810 is shown by an arrow having dashed lines, and the change in difficulty rating from applying the second formula 812 is shown by an arrow having solid lines. In this example, first differences 814 and 816 represent the difference between the first difficulty rating 802, updated using the first formula, and the intermediate rating 806 for each scenario 804, 806. Second differences 818 and 820 represent the difference between the first difficulty rating 802, updated using the second formula, and the intermediate rating 806 for each scenario 804, 806. As shown, in each scenario, the first difference 814 or 816 is greater than the second difference 818 or 820. This is because the second formula augments changes in difficulty ratings toward intermediate rating 806 (and hence toward difficulty ratings between the first and second threshold difficulty ratings), and reduces changes in difficulty ratings away from intermediate rating 806 (and hence away from difficulty ratings between the first and second threshold difficulty ratings).

It will be appreciated that although FIG. 8 illustrates the contrasting results of updating a hard difficulty rating using a first and second formulas, analogous results would occur when updating an easy difficulty rating using the first and second formulas. That is, a change in the easy difficulty rating toward the intermediate rating would be greater when applying the second formula as compared to the first formula. Similarly, a change in the easy difficulty rating away from the intermediate rating would be lesser when applying the second formula as compared to the first formula.

There are countless ways to configure a game server 102 to implement the differential treatment of difficulty ratings outside of the threshold difficulty ratings, described above. In one example, if a first difficulty rating is outside of a pair of threshold difficulty ratings, then any changes to the difficulty rating toward an intermediate value (e.g. by applying the example FIRST FORMULA, above) are increased (e.g. doubled), and changes to the difficulty rating away from the intermediate value are reduced (e.g. halved).

As discussed above, in at least one embodiment, users 110 can select a difficulty level (corresponding to a difficulty rating or a range of difficulty ratings) in order to tailor the difficulty of the game and improve their user experience. Accordingly, if media tracks have difficulty ratings that do not reflect the difficulty that users generally experience correctly identify a media track, then a user's attempt to tailor the difficulty of the game can be frustrated to the detriment of their user experience. In some cases, a relatively unknown media track that is very difficult for users to identify, can become popular and very easy to identify. If the media track developed an intensely difficult difficulty rating when it was relatively unknown, it could take a great amount of difficulty-decreasing gameplay data (e.g. correct turn results) from a great number of turns over a great amount of time before the difficulty rating of the media track adjusts to the media track's new found popularity. This may produce a significant period of time where there is a disparity between the difficulty rating of the media track and users' difficulty in identifying the media track. In some embodiments, the differential treatment described above can help to reduce the time period of disparity by gravitating difficulty ratings that are outside of a pair of difficulty threshold ratings toward values inside the pair of difficulty threshold ratings.

The invention claimed is:

1. A method of providing references to client devices, the method comprising:
   storing, on a storage device, a plurality of references,
      each of the plurality references identifying a location of a media track file containing a media track,
      the plurality of references including a first reference identifying a first location of a first media track file containing a first media track;
   storing, on the storage device, a playability rating for each of the plurality of references;
   updating the playability rating for the first reference based on an elapsed time for a first client device to receive a predetermined portion of the first media track file;
   excluding the first reference from a selection of the plurality of references, in response to determining the playability rating for the first reference is below a threshold playability rating; and
   sending the selection to a second client device,
      the selection including one or more references of the plurality of references,
      each of the one or more references identifying the location of a media track file that is eligible for download by the second client device.

2. The method of claim 1, further comprising:
   receiving the elapsed time from the first client device.

3. The method of claim 1, further comprising:
   before sending the selection, receiving a request for references from the second client device.

4. The method of claim 1, further comprising:
   receiving a request for references from the first client device; and
   sending the first reference to the first client device.

5. The method of claim 1, further comprising:
   storing, on the storage device, the elapsed time.

6. The method of claim 1, further comprising:
   storing, on the storage device, an average elapsed time of a plurality of elapsed times,
      each of the plurality of elapsed times is an elapsed time for one of a plurality of client devices to download the predetermined portion of the first media track;
   wherein the updating is based on the average elapsed time.

7. The method of claim 1, wherein excluding the first reference from the selection of the plurality of references comprises:
   storing in the storage device an indication that the first media track is below the threshold playability rating.

8. The method of claim 1, wherein excluding the first reference from the selection of the plurality of references comprises:
   randomly selecting the one or more references from a subset of the plurality of references, the subset excluding the first reference.

9. The method of claim 1, further comprising storing an identification of the predetermined portion on the storage device.

10. The method of claim 9, wherein the identification comprises one of a time duration, a percentage, and a number of bytes.

11. A non-transitory computer-readable medium comprising instructions executable by one or more processors, wherein the instructions when executed configure the one or more processors to collectively:
   store, on a storage device, a plurality of references,
      each of the plurality references identifying a location of a media track file containing a media track,
      the plurality of references including a first reference identifying a first location of a first media track file containing a first media track;
   store, on the storage device, a playability rating for each of the plurality of references;
   update the playability rating for the first reference based on an elapsed time for a first client device to receive a predetermined portion of the first media track file;
   exclude the first reference from a selection of the plurality of references, in response to determining the playability rating for the first reference is below a threshold playability rating; and
   send the selection to a second client device,
      the selection including one or more references of the plurality of references,
      each of the one or more references identifying the location of a media track file that is eligible for download by the second client device.

12. A server device for providing references to client devices, the server device comprising:
   a memory storing computer readable instructions; and
   one or more processors configured to execute the computer readable instructions,
   the computer readable instructions configuring the one or more processors to collectively:
      store, on a storage device, a plurality of references,
         each of the plurality references identifying a location of a media track file containing a media track,
         the plurality of references including a first reference identifying a first location of a first media track file containing a first media track;
      store, on the storage device, a playability rating for each of the plurality of references;

update the playability rating for the first reference based on an elapsed time for a first client device to receive a predetermined portion of the first media track file;

exclude the first reference from a selection of the plurality of references, in response to determining the playability rating for the first reference is below a threshold playability rating; and send the selection to a second client device,
the selection including one or more references of the plurality of references,
each of the one or more references identifying the location of a media track file that is eligible for download by the second client device.

13. The server device of claim 12, wherein the one or more processors are further configured to, collectively:
receive the elapsed time from the first client device.

14. The server device of claim 12, wherein the one or more processors are further configured to, collectively:
before sending the selection, receive a request for references from the second client device.

15. The server device of claim 12, wherein the one or more processors are further configured to, collectively:
receiving a request for references from the first client device; and
sending the first reference to the first client device.

16. The server device of claim 12, wherein the one or more processors are further configured to, collectively:
store, on the storage device, the elapsed time.

17. The server device of claim 12, wherein the one or more processors are further configured to, collectively:
store, on the storage device, an average elapsed time of a plurality of elapsed times,
each of the plurality of elapsed times is an elapsed time for one of a plurality of client devices to download the predetermined portion of the first media track;
wherein the updating is based on the average elapsed time.

18. The server device of claim 12, wherein excluding the first reference from the selection of the plurality of references comprises:
storing in the storage device an indication that the first media track is below the threshold playability rating.

19. The server device of claim 12, wherein excluding the first reference from the selection of the plurality of references comprises:
randomly selecting the one or more references from a subset of the plurality of references, the subset excluding the first reference.

20. The server device of claim 12, wherein the one or more processors are further configured to, collectively:
store an identification of the predetermined portion on the storage device.

21. The server device of claim 20, wherein the identification comprises one of a time duration, a percentage, and a number of bytes.

* * * * *